Nov. 15, 1966      E. S. MURPHY      3,285,008
SPLINED DRIVE CONNECTION FOR HYDRODYNAMIC TORQUE CONVERTER
AND LUBRICATION MEANS THEREFOR

Filed Dec. 31, 1964      3 Sheets-Sheet 1

Inventor
Eugene S. Murphy
By Joseph W. Malleck
Att'y

Inventor
Eugene S. Murphy
By Joseph W. Malleck
Atty.

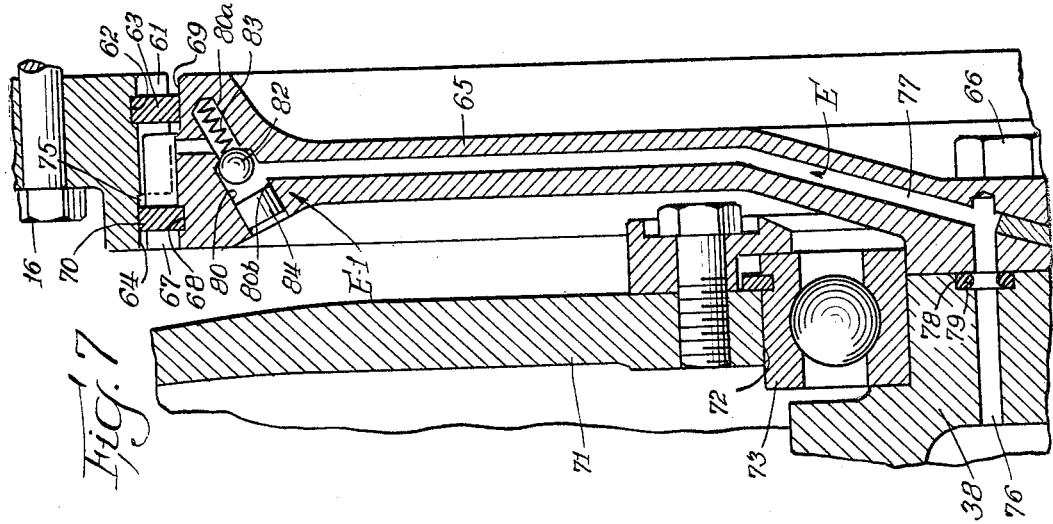
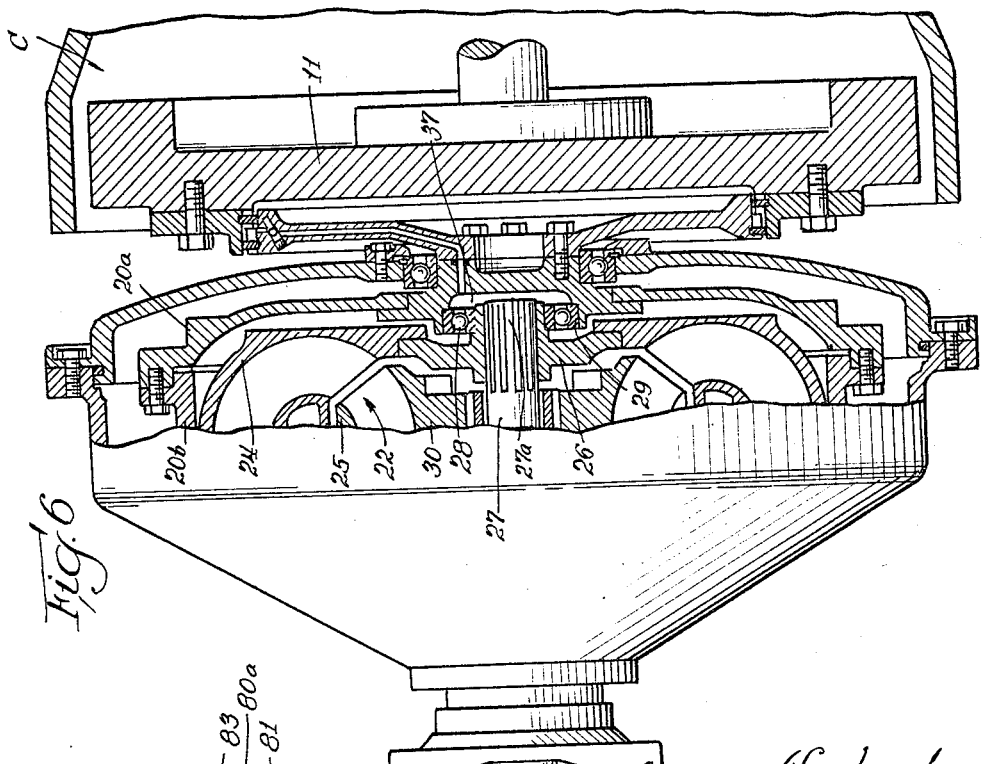
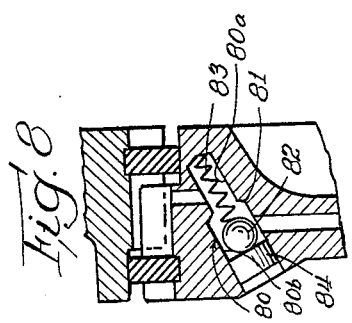

United States Patent Office 3,285,008
Patented Nov. 15, 1966

3,285,008
SPLINED DRIVE CONNECTION FOR HYDRODYNAMIC TORQUE CONVERTER AND LUBRICATION MEANS THEREFOR
Eugene S. Murphy, Rockford, Ill., assignor to Borg-Warner Corporation, a corporation of Illinois
Filed Dec. 31, 1964, Ser. No. 422,589
4 Claims. (Cl. 60—54)

This invention relates to transmission mechanisms including a hydraulic torque converter of the rotating-housing type and is concerned more particularly with an arrangement for lubricating the toothed or splined driving connection to the rotating housing of the converter.

A common method of providing a driving connection between a power source, such as an engine, and the rotating housing, which normally includes the converter impeller, is through an annulus of meshing gear teeth carried in part by the engine flywheel and in part by a spider or housing element of the converter. This detachable driving connection between the engine and transmission not only permits convenient field repairs, but also has led to manufacturing practices where engine and transmission manufacturers produce their components as distinct packages. It is important, therefore, that means utilized to reduce rattle and wear resulting from misalignment or relative sliding of the meshing teeth of the driving connection be self-contained in one or the other of said engine or transmission components.

Devices which have been suggested in the past, although not self-contained, have included packing the gear tooth area with grease, filling the tooth annulus with oil and sealing the oil therein, both these suggestions being undesirable due to critical sealing problems. It has also been suggested that a continuous supply of oil be tapped from the converter circuit and carried between the tooth annulus; this has a major disadvantage in that centrifugal forces build up between the converter drive housing and the flywheel and may become dangerously high since the forces follow the equation $$F = M \frac{v^2}{r}$$

to resist such load or separting force, crankshaft thrust bearings and converter bearings would have to be so large that the design would be impractical.

It is, therefore, a primary object of this invention to provide means for continuously maintaining a submergence of the teeth or splines in a continuous flow of fluid while power is being transmitted between the flywheel and converter, said structural means being totally contained by said converter and effective to regulate the pressure of said fluid bath to obviate the effects of centrifugal force.

Other objects and advantages of this invention will become more apparent from the following detailed description taken in connection with the accompanying drawings in which:

FIGURE 6 is an elevational view, partly in central section of an alternative transmission mechanism employing the principles of this invention;

FIGURE 7 is an enlarged fragmentary sectional view of portion of the structure of FIGURE 6; and FIGURE 8 is a fragmentary view of a portion of the structure shown in FIGURE 5 illustrating another condition of operation.

Figure 1:
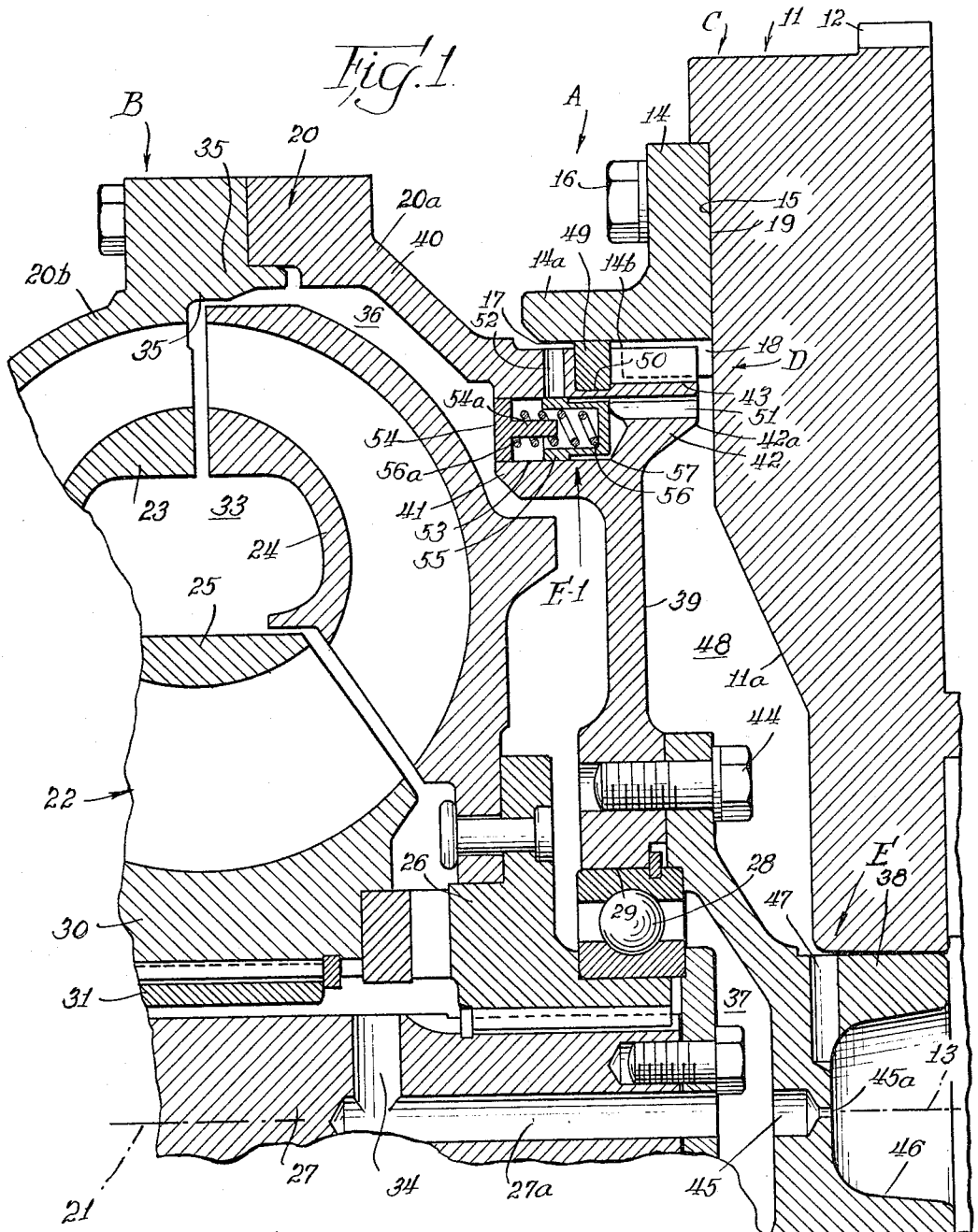
FIGURE 1 is a fragmentary central sectional view of a transmission mechanism embodying the principles of this invention.
Figure 4:
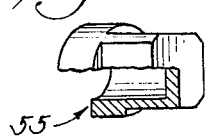
FIGURE 4 is a composite view illustrating the pressure valve employed in the structure of FIGURE 1.
Figure 2:
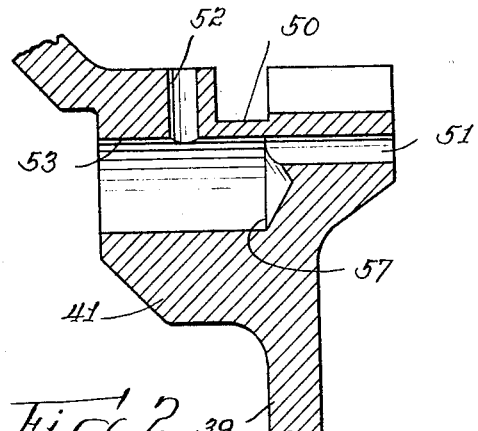
FIGURE 2 is an enlarged fragmentary sectional view of a portion of the structure of FIGURE 1.
Figure 3:
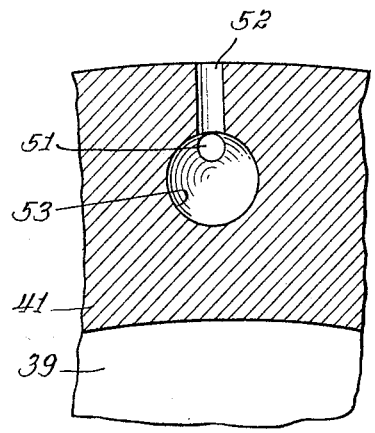
FIGURE 3 is a sectional view taken substantially along line 3—3 of FIGURE 2.

Turning now to the drawings and more particularly to FIGURES 1–4, there is illustrated a preferred embodiment of this invention and broadly comprises a transmission mechanism A having a hydrodynamic transmitting means B drivingly connected to an engine driven member of flywheel C, the connection being provided by means D defined on portions of said driving member and converter; fluid means E is employed to supply fluid at a controlled rate for maintaining said driving connection means D continuously based in fluid and including pressure responsive means E–1 for exhausting fluid surrounding said connection means upon the attainment of a predetermined pressure condition resulting primarily from centrifugal force effects.

Turning now more particularly to the components thereof, the driving member or flywheel C comprises an annular rotary member 11 driven by an engine means (not shown) and suitably attached thereto, here shown to be at points 12 at the outer periphery of member 11. The connection of the member 11 to the engine determines a first journalling axis 13 for the driving member D. A drive gear or ring 14 is secured to a recessed rear face 15 of member 11 by suitable means, such as fasteners 16, extending therethrough and into the member 11; ring 14 has an axially extending flange 14a provided with an interior cylindrical surface 17 carrying a plurality of annularly arranged splines 18 having their greatest extent parallel to the axis 13. Splines 18 extend from the interior surface 19 of the ring to an intermediate portion 14b thereof leaving an interrupted cylindrical portion of surface 17 against which a seal may bear, as will be described.

The hydrodynamic transmission means D is of the rotative-housing type having a housing 20 comprised of front and rear shell portions 20a and 20b respectively journalled for rotation about an axis 21 independent of axis 13 about which the driving member C is journalled. The transmitting means B comprises a hydraulic power circuit means 22 contained within said housing and having bladed elements including an impeller 23, turbine 24, and a stator 25. The impeller 22 is integrally formed to the rear shell portion 20b and receives rotative power therefrom. Turbine 24 is drivingly carried on a hub 26 which is drivingly splined to an output shaft 27 concentrically extending through the central portion of the converter; shaft 27 has a front end 27a journalled within a bearing 28 received by a central opening wall 29 of portion 20a of the housing. The stator element 25 has a hub 30 splined to a sleeve shaft 31 received about the output shaft 27 and is effective to be maintained stationary for providing a reaction for the torque converter. Hydraulic oil or other fluid is supplied to the semi-torodial chamber 33 defined by elements 23–25 of the converter through passage 34 to maintain an operative filling of same. Fluid is discharged by the impeller blades and flows to the turbine and then to the stator whereby a portion of the fluid may be discharged into a reversely curved passage 35 communicating with a space 36 defined between the exterior of the turbine element 24 and the interior of the front shell portion 20a, whereby fluid may pass to the bearing 28 and into a space 37 defined between the front portion 27a of the driven shaft 27 and a pilot hub 38 attached to portion 20a and journalled in the flywheel of the converter housing.

Front shell portion 20a of the converter housing is comprised of flat front wall 39 having a central opening 29 receiving said bearing 28; the front wall is integrally connected with a cupped shaped portion 40 separated by a shoulder portion 41 having an annular pertuberance 42 upon which is defined a plurality of axially directed splines 43 effective to mesh with splines 18 of the driving ring 14. The front shell portion 20a is coupled to the pilot hub 38 by fasteners 4, and hub 38 has passage 45 terminating in a restricted bleed orifice 45a communicating space 37 with the hollow interior 46 of the hub 38. A radially directed passage 47 communicates hub interior 46 with a chamber 48 defined between the rear face 11a of the flywheel and the front shell portion 20a when related together with said splines 18 and 43 intermeshed.

In order that hydraulic fluid admitted to chamber 48 may be locally retained about the interengaged or meshing splines, an annular sealing ring 49 is disposed in a groove 50 defined in the shoulder 41 of said front shell portion 20a and at a position adjacent the splined connection and effective to extend radially outwardly for engaging the continuous cylindrical surface 17 of said drive ring whereby a local annular chamber is defined about the said splines where fluid may be trapped or maintain an annulus as urged by centrifugal force upon operation of the transmission.

Pressure responsive means E–1 for exhausting fluid from chamber 48 and particularly from the space adjacent the splines comprises a passage 51 extending axially and rearwardly from the front face 42a of protuberance 42 at a point adjacent the roots of the splines 43; a radially directed passage 52 communicates with a point on the exterior of the front shell portion 20a remote from the teeth and effective to return fluid back to sump. A cylindrical chamber 53 is interposed between said passages 51 and 52 and is closed at one end by a stop member 54 having a central interior nose 54a. A slidable valve member 55 is provided therein effective to be urged by coil spring 56, having one end 56a journalled on nose 54a, against a valve seat 57 for normally closing the communication between said axial and radial passages 51 and 52. Spring 56 is selected to permit valve member 55 to open and exhaust fluid upon the attainment of a predetermined fluid pressure condition within said chamber 48 resulting from excessive pressure built up by centrifugal forces.

Figure 5:
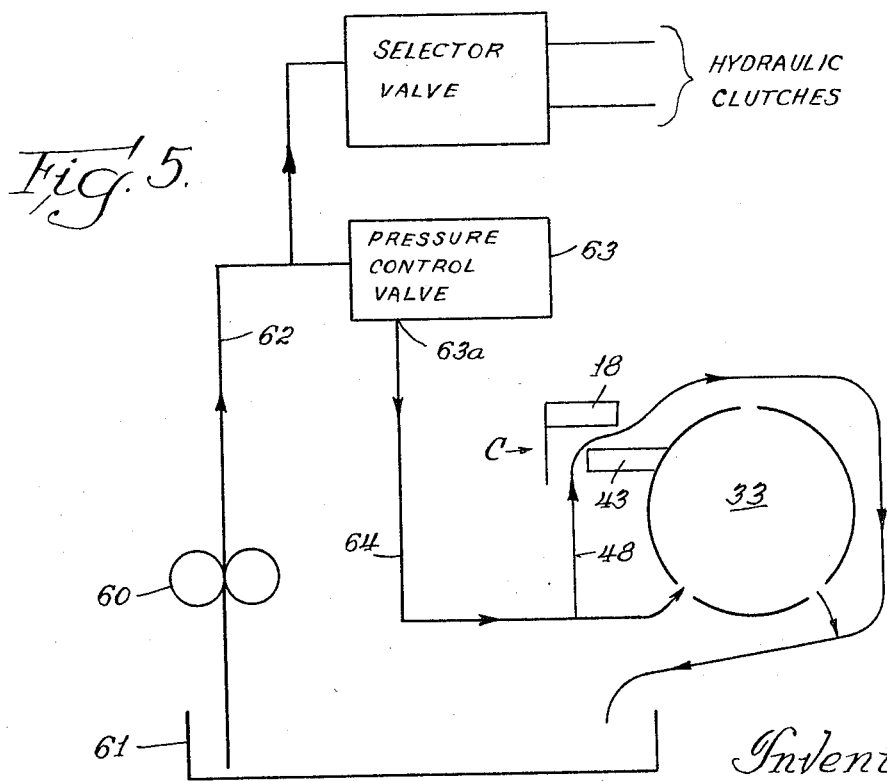
FIGURE 5 is a schematic illustration of a hydraulic system for operation of the transmission mechanism of FIGURE 1.

As suggested in the schematic illustrated in FIGURE 5, pump 60, driven by the driving member, draws oil from a sump 61 and delivers the same through a pipe to a control valve 63 having a pressure outlet side 63a connecting to a pipe 64 allied with passage 34 leading to the toroidal chamber 33 of the torque converter. The outlet flow from toroidal chamber 33 through the reverse passage 35 into the chamber 36 and to chamber 48 whereby it may drain back to sump through exhaust means E–1. The fluid sequestered to chamber 48 is fed at a controlled rate by orifice 45a and, as a result of the flywheel and the housing rotating, is centrifugally thrown outwardly and trapped as a ring of fluid about the intermeshed splines. The pressure responsive means E–1 is effective to maintain the ring of fluid within desirable limits of volume and pressure. The accumulation of too large a mass of oil in the chamber would result in a centirfugal pressure head that would adversely affect the bearings; oil is therefore drained from the chamber by means E–1 which is self-contained by the converter.

Turning now to FIGURES 6–8, there is illustrated an alternative embodiment of this invention which is particularly adapted for a "dry" type flywheel construction. Similar parts to those of the preferred embodiment will be identified with similar reference numerals. The driving member C, as shown in FIGURE 6, has a drive ring 60 provided with a plurality of internal splines 61 depending from cylindrical surface 64 and extending from the front face 60a of the ring to an intermediate portion thereof; and annular grooves 62 is defined across said splines 61 effective to receive a sealing element 63 as will be described. The hydrodynamic transmitting means or torque converter B is similar to that of the preferred embodiment and has a pilot hub 38 carrying a driving wheel converter input gear 65; wheel is drivingly secured to hub 38 by fasteners 66 and has a plurality of splines 67 on the radial outer periphery thereof effective to partially overlap and engage with splines 61 of said driving member 60. A groove 68 is defined in the outer periphery of surface 69 of the wheel 65 and extends through said wheel splines 67 for receiving a sealing ring 70 rearward of splines 61 and effective to engage surface 64.

An outer casing 71 is provided about the housing 20 of the torque converter effective to maintain an oil resevoir for the converter, and has a central opening 72 in the front portion thereof effective to receive a bearing 73 therein journalled on the pilot hub 38 of the converter; retainer means 74 is employed to hold the bearing 73 inplace.

The fluid means E of this embodiment, comprises an annular chamber 75 defined between said seal rings 63 and 70 and the surfaces 64 and 69 from which the splines extend; the chamber 75 is effective to maintain an oil bath about said intermeshed splines or teeth; the seals are spaced axially apart a distance effective to permit approximately one half of the spline length to engage the other splines. A supply of the fluid is provided by means E by way of axial passage 76 in the converter pilot hub communicating oil from the chamber 33 of the converter with passages 77 which extend radially outwardly through the wheel 65 to the annular chamber 75 about the splines. A recess 78 is concentrically defined about the terminal end of passage 76 for receiving a seal 79 effective to seal with the rear face 65a of wheel 65. A cylindrical stepped bore 80 is defined in the outer portion of the wheel 65 and interrupts passage 77; bore 80 has an annular shoulder 81 for defining a valve seat against which a ball valve 82 may be urged by centrifugal force to close communication of passage 77 with the annular space 75 between said seals (as shown in FIGURE 7). The ball member is normally urged away rom seat 81 by a spring 83 received in the narrow portion 80a of the stepped bore to a position for maintaining said passage unobstructed (as shown in FIGURE 8). A stop member 84 is disposed at the inner end of the enlarged portion 80b or bore 80 for closing same.

Operation of the embodiment of FIGURES 6–8 comprises sequestering of the hydraulic fluid from the power circuit means 22 through the passages 76 and 77 to the annular channel or chamber 75 surrounding said engaged teeth. This is readily permitted at low rotating speeds of the converter, driving member and wheel 65 whereby the ball valve 82 will be restrained by spring 83 to provide a complete communication with chamber 75. As greater speeds are assumed by wheel 65, the ball valve 82 will be urged by centrifugal force to overcome springs 83 and close across seat 81 thereby trapping an annulus of fluid within the chamber 75. Fluid pressure is prevented from becoming unwantedly high by virtue of the ability of ball valve 82 to bleed excessive pressure. This version has the advantage of providing a generally "dry" type flywheel connection while at the same time utilizing the characteristics of an oil bathed toothed connection.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. A transmission mechanism comprising: a rotative driving member carrying a plurality of teeth; a hydrodynamic transmitting means to which fluid pressure is supplied to maintain an operative filling, said hydrodynamic transmitting means being journaled independently of said rotative driving member and having teeth arranged adjacent the outer periphery thereof and in mesh with the teeth of said driving member for receiving rotative power therefrom, said hydrodynamic transmitting means and driving member being associated to define a chamber adjacent said outer periphery and within which said teeth are disposed; and means contained by said hydrodynamic transmitting means for supplying fluid at a controlled rate therefrom to said chamber and including pressure responsive means for exhausting fluid from said chamber upon attainment of a predetermined pressure condition therein while maintaining said teeth continuously bathed in fluid.

2. A transmitting mechanism as in claim 1, in which the housing of said hydrodynamic transmitting means comprises front and rear shell portions effective to be joined together to constitute a toroidal fluid circuit with in which is received bladed elements constituting said hydrodynamic transmitting means, the front shell portion having a pilot hub within which is defined restricted bleed passages communicating the fluid of said circuit with said chamber, and said means for exhausting fluid from said chamber comprising an exhaust passage communicating with said chamber and including a pressure responsive valve interposed in said exhaust passage effective to normally prevent communication therethrough until a predetermined pressure condition is achieved by said fluid in said chamber.

3. A power transmission comprising: a hydraulic power circuit means to which working oil is constantly supplied to maintain a filling of same and including an annular, externally toothed, input member axially spaced from and said substantially axially aligned with the power circuit means, an annular driving member having internal teeth meshing with the teeth of the input member as the sole driving connection therebetween, the input member being independently journaled relative to the driving member, the input and driving members being cooperatively shaped to define an annular chamber coaxial with the power circuit means and into which the respective teeth extend, an annular seal closing an end of the chamber on one side of the teeth and interposed between the input and driving members, means for bleeding the oil at a controlled rate from the power circuit means for supply to the chamber, an exhaust passage in the input member for tapping the oil in the chamber at a point close to and radially inwardly of the teeth on the input member, and pressure responsive means for normally maintaining said passage closed until a predetermined pressure condition of said oil in said chamber is achieved.

4. A power transmission as defined in claim 3, wherein the controlled bleeding rate is determined by means defined in the input member.

References Cited by the Examiner
UNITED STATES PATENTS

| | | |
|---|---|---|
| 1,541,007 | 6/1925 | Thiemer. |
| 1,873,688 | 8/1932 | Walker _____ 60—54 |
| 2,719,616 | 10/1955 | Ahlen _____ 60—54 X |
| 2,731,119 | 1/1956 | Burdett et al. _____ 60—54 X |
| 2,873,831 | 2/1959 | Sinclair _____ 60—54 X |
| 2,878,642 | 3/1959 | Maurice et al. _____ 60—54 X |

References Cited by the Applicant
UNITED STATES PATENTS

| | | |
|---|---|---|
| 2,461,217 | 2/1949 | Lapsley et al. |
| 2,969,131 | 1/1961 | Black et al. |
| 3,002,593 | 10/1961 | Black et al. |
| 3,008,312 | 11/1961 | Jacobus. |

JULIUS E. WEST, *Primary Examiner.*